Jan. 18, 1966 J. HLUSZKO 3,229,355

METHOD OF MAKING A MAGNETIC TRANSDUCER HEAD

Filed Jan. 2, 1962 2 Sheets-Sheet 1

INVENTOR
JOHN HLUSZKO

BY *Frederick D. Poag*

ATTORNEY

United States Patent Office 3,229,355
Patented Jan. 18, 1966

3,229,355

METHOD OF MAKING A MAGNETIC TRANSDUCER HEAD

John Hluszko, Red Hook, N.Y., assignor to International Business Machines Corporation, New York, N.Y., a corporation of New York Filed Jan. 2, 1962, Ser. No. 163,504
1 Claim. (Cl. 29—155.5)

This invention relates to the manufacture of magnetic read and/or write transducer heads, and more particularly to a method of making a transducer shoe for such a head having a magnetic core characterized by a closely toleranced gap.

Magnetic transducer heads adapted to expose a magnetic recording medium to a magnetic field which varies in accordance with energization of a "write" winding in the head, and/or to sense variations in magnetic flux pattern of the recording medium for corresponding induction of a signal in a "read" winding in the head, are well known and widely employed. Characteristically, such heads include a core of magnetic material, upon which the read/write windings are wound, which has at least one gap positioned so as to expose the recording medium to the flux of the magnetic circuit of the head, and/or vice versa. Where the data density recorded or to be recorded on the magnetic record medium is high, as is frequently the case in magnetic drum and tape units employed in data processing apparatus, the aforedescribed transducer core may have a thickness, and the gap therein may have a width, in the order of only one one-hundredth and one one-thousandth of an inch, respectively. Accordingly, exact alignment of the pole faces forming the gap, and maintenance of close tolerances in the width of the gap are matters which affect the performance of the transducer head and require a high degree of manufacturing control.

One method which has been employed heretofore, in the manufacture of the core of a transducer of the above-described kind, has involved cutting a slot through the core workpiece, distorting the workpiece so as to enable fitting a copper shim into the slot, realigning the core workpiece portions into properly opposing position at opposite sides of the shim, soldering the shim to those opposing portions, and trimming away the excess shim and solder material. It will be seen that this prior method involves a number of delicate steps and, when employed on a production basis, calls for the use of complicated and closely toleranced jigs and the like. Furthermore, the distorting and re-aligning of the core involved is likely to result in cold working of the core material in a degree which will affect the magnetic properties thereof, and, unless the solder applied is carefully confined or trimmed away it may amount to a short circuited winding on the core and therefore be detrimental to proper operation of the transducer.

In accordance with the present invention, a core workpiece is provided, and a narrow slot which will later form the magnetic gap is cut part way, but not completely through, the workpiece so as to leave a bridge portion of the original workpiece material across a blind end of the slot. Next, non-magnetic filler material is placed in the slot, and then the bridge portion of the workpiece is removed. Preferably, the filler material employed is what may be termed a potting compound, that is, it flows into the slot in the workpiece without the need for such mechanical force as would distort the workpiece, and hardens or cures in place in a manner to become an integral part of the final assembly. Conveniently, the potting compound is operative at the same time to secure the core workpiece in and to the shoe part of the magnetic head by which the core will be located, when the head is in operation, in juxtaposition to the magnetic recording medium. Desirably, the shoe workpiece is relieved in the region which receives the slot-containing portion of the core workpiece so as to enable the potting compound to flow readily into the slot and to surround the same in a manner which insures a strong and dimensionally accurate final assembly.

Accordingly, a general object of the present invention is to provide an improved method of making a magnetic transducer head having a gap-containing core with closely controlled operating properties.

Another object of the invention is to provide a method as aforesaid wherein the pole faces of the gap are precisely spaced and inherently aligned.

Still another object of the invention is to provide a method of producing a magnetic transducer head as aforesaid involving a minimum of cold working and handling of the magnetic core workpiece.

Still another object of the invention is to provide a manufacturing method as aforesaid which reduces need for elaborate and accurate jigs and avoids the use of electrically conductive materials, such as solder, in and around the gap-forming portions of the magnetic core.

Yet another object of the invention is to provide an improved transducer production method which, by elimination of complicated manufacturing steps, reduces unit production time and unit production cost while increasing the proportion of the manufactured units which successfully meet performance specifications.

The foregoing and other objects, features and advantages of the invention will be apparent from the following more particular description of a preferred embodiment of the invention, as illustrated in the accompanying drawings.

Figure 1:
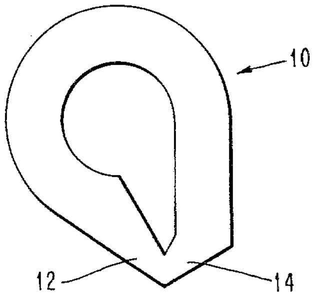
FIG. 1 is an elevation view of a core workpiece in which a magnetic pole face forming gap is to be provided in accordance with the invention.

In the example by which the method of the invention is illustrated, the core workpiece 10 is shown in FIG. 1 to have a ring-like configuration. It will be understood that it could have other configurations in accordance with the particular design of the magnetic circuit to be fabricated and could, in fact, constitute merely a part of a more complicated core assembly. In any case, it has portions 12, 14 which are to become pole portions at opposite sides of a magnetic gap. The workpiece 10 may constitute, for example, a laminate of nine layers of magnetic metal of suitable characteristics, such as a high permeability transformer iron, each layer being in the order of one thousandth of an inch thick. Edges of these laminae are indicated diagrammatically in FIG. 2 by the vertical lining in the edge view of the core workpiece 10. In the manufacture of the workpiece 10, the laminae may be first annealed for maximum permeability, and then bonded together by means of epoxy resin adhesive to form an assembly in the order of thirteen one-thousandths of an inch thick.

Figure 2:
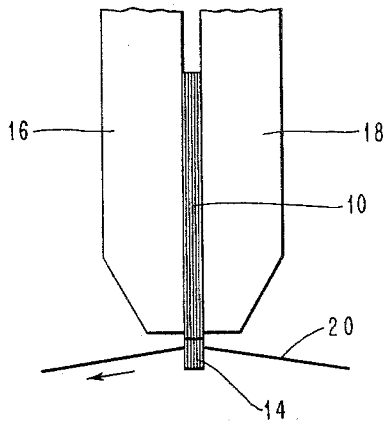
FIG. 2 shows a side view of the workpiece of FIG. 1, held in a jig during a slot-cutting operation in accordance with the invention.

In FIG. 2, the workpiece 10 is shown clamped in a jig having jaws 16, 18, in a sawing apparatus by which a slot is cut part way through the workpiece between the pole portions 12, 14 and transverse to the laminae thereof. Any suitable sawing apparatus may be utilized, such as one which draws a fine tungsten wire or other hard material filament 20 past the workpiece with pressure thereagainst. For this purpose the sawing apparatus may be of the kind which includes a source reel from which the wire 20 is drawn under tension to a takeup/drive reel. The respective reels, or suitable idler pulleys, are located to define a deflection in the tensioned wire 20 as it passes the workpiece, as indicated in FIG. 2. By means of a sawing technique of this kind it is possible to cut a slot of very fine detail. For example, the cutting filament 20 may be tungsten wire in the order of seven ten-thousandths of an inch diameter which is operative as aforedescribed to make a slot having a width of the same dimensional order and bounded by well aligned opposing faces.

Figure 3:
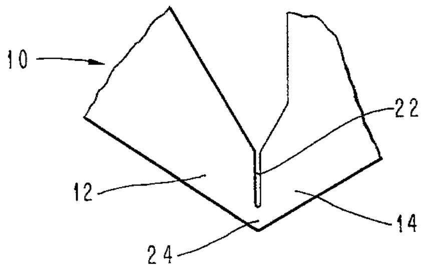
FIG. 3 is an enlarged, fragmentary elevational view showing the workpiece after the slot cutting operation of FIG. 2 has been completed.

This slot resulting from the sawing step of FIG. 2 is shown at 22 in FIG. 3. It should be noted that, while the sawing was continued long enough to establish the final opposing pole faces at the opposite sides of slot 22, it was stopped short of complete travel through the workpiece, so as to leave a bridge portion 24 of the workpiece interconnecting the pole portions 12, 14. This bridge portion maintains the side walls of the slot 22 in fixed alignment and spacing.

It will be understood that, during the sawing operation, any suitable lubricant such as water may be utilized. Once the sawing has been completed, that is, the slot 22 has been cut to the state illustrated in FIG. 3, the entire workpiece 10 is removed from the jig 18 and the cutting wire 20 is unthreaded therefrom, and the workpiece is suitably cleaned, such as in an ultrasonic bath of water and detergent.

In accordance with the invention, subsequent manufacturing steps involve placing potting material in the slot 22 and then removing the bridge portion 24. Advantageously, the workpiece 28 for the body of the transducer shoe part, which will mount the core in the finished assembly may be used as means for retaining the potting compound during its placement in the slot 22 and also as what amounts to a jig for holding the core part during the removal of the bridge portion 24.

Figure 4:
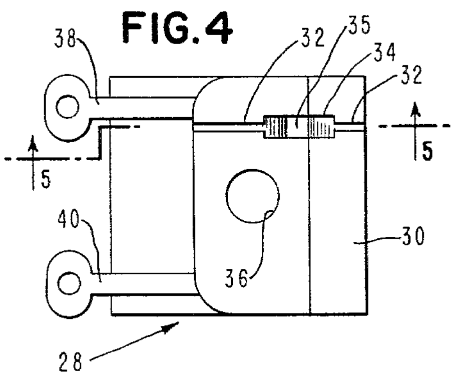
FIG. 4 is a plan view of a shoe body workpiece to be employed in fabrication of the magnetic head.

An example of such a transducer shoe workpiece 28 is shown in FIG. 4 to comprise a body 30 having a cavity or slot 32 contoured to receive the core workpiece 10 in generally closely fitting relation. However, the slot 32 is formed with a relieved portion 34 in the region which receives the pole portions 12, 14 of the core workpiece 10. This portion of the slot extends downwardly to provide an aperture 35 in the bottom surface 46 of the shoe part through which a portion of the bridge part 24 of the core workpiece will protrude. The shoe body 30 may be of any suitable material such as molded epoxy resin and may have such features as desired for mounting and use in the finished transducer head; for example, it may be configured with a socket portion 36 and may mount flexible metallic anchorages 38, 40.

Figure 6:
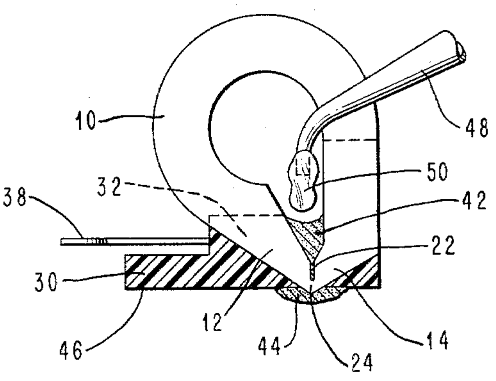
FIG. 6 is a sectional view similar to FIG. 5 but showing the partially processed core workpiece of FIG. 3 in place in the shoe body workpiece during the potting or cementing operation.
Figure 5:
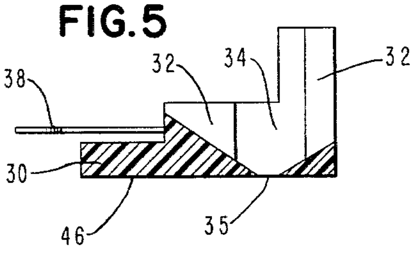
FIG. 5 is a sectional view taken about along line 5—5 of FIG. 4.

The step of cementing or potting the core 10 in place in the slot 32 of the shoe workpiece 28 is shown in FIG. 6. Any suitable casting or potting compound or material which will attain the desired hardness and adhesive properties may be utilized, such as an epoxy resin adhesive of the "two stage" type composed of "filler" and "hardener." For avoiding a shortcircuited winding effect, the potting compound 42 should be electrically non-conducting or at least of suitably high resistivity. Also, of course, the adhesive which is used in laminating the core workpiece 10, and the potting compound 42 and the material of the shoe workpiece body 30 should be compatible.

Preferably, some of the potting compound 42 is placed in the slot 32 prior to insertion of the core piece 10 therein. Thus, when the core is inserted into the slot, the potting compound thoroughly coats and bonds together the contiguous faces of the slot 32 and the core piece 10. The potting material 42 flows into and fills the slot 22 in the core piece in a manner which, in combination with the permanent bonding of the adjacent pole portions 12, 14 to the transducer shoe body 30, operates to fix permanently the mutual relationship of the opposing faces of the core piece slot 22. For facilitating displacement of air from the slot, some of the potting compound may be allowed to ooze through the aperture 35 in the bottom surface of the shoe blank or workpiece as indicated at 44. Excess in this regard may be prevented if desired by the application of a temporary barrier on the bottom surface 46 of the shoe blank and the protruding bridge portion 24 of the core workpiece. A length of pressure sensitive cellophane adhesive tape (not shown) may be used for this purpose if desired. In addition to or in lieu of placing the potting compound 42 in the slot 32 of shoe body 30 before insertion of the core part 10 therein, the potting compound may be applied after the core part 10 is in place in the shoe body. In FIG. 6, the step of adding the compound 42 is indicated, in either case, by the showing of a probe 48 from which the potting compound 42 is allowed to drip as a glob 50.

Figure 7:
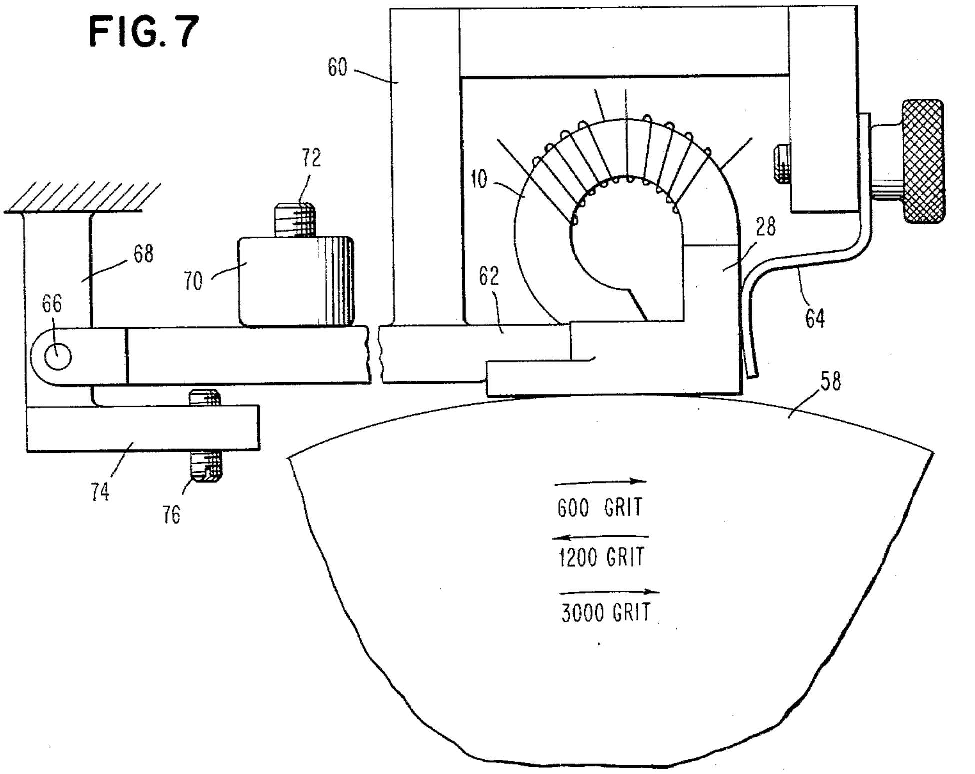
FIG. 7 is illustrative of a grinding step by which excess material is removed from the shoe body and core workpieces.

The next step in the manufacturing process is to remove the excess material from the transducer shoe workpiece which has been assembled in FIG. 6, so as to eliminate the bridge portion 24 of the core workpiece 10 and at the same time give the transducer shoe its final bottom contour. For this purpose, the assembly is mounted, as shown in FIG. 7, in a jig 60 having opposing jaw portions 62, 64 which receive and hold the shoe body part 28 with the bottom surface of the latter in position against the abrading surface of a grinding wheel 58. The jig 60 may be connected hingedly at 66 to a support 68 whereby it is maintained in proper position with respect to the grinding wheel 58, and may include a weight 70 mounted replaceably on a stud 72 for applying the proper grinding pressure. The support may include a stop arm 74 mounting a set screw 76 which is adjustable to limit the travel of the jig 60 toward the grinding wheel and thereby limit the extent of grinding practiced upon the workpiece.

The grinding wheel may be of any suitable kind, such as a proper clad wheel to which diamond dust or grit has been applied. The grinding operation may be executed in successive steps starting with a roughing operation carried out in a first direction with 600 grit, followed by an intermediate grinding operation carried out in the opposite direction with 1200 grit and a final polishing operation carried out in the first direction with 3000 grit.

Figures 8, 9:
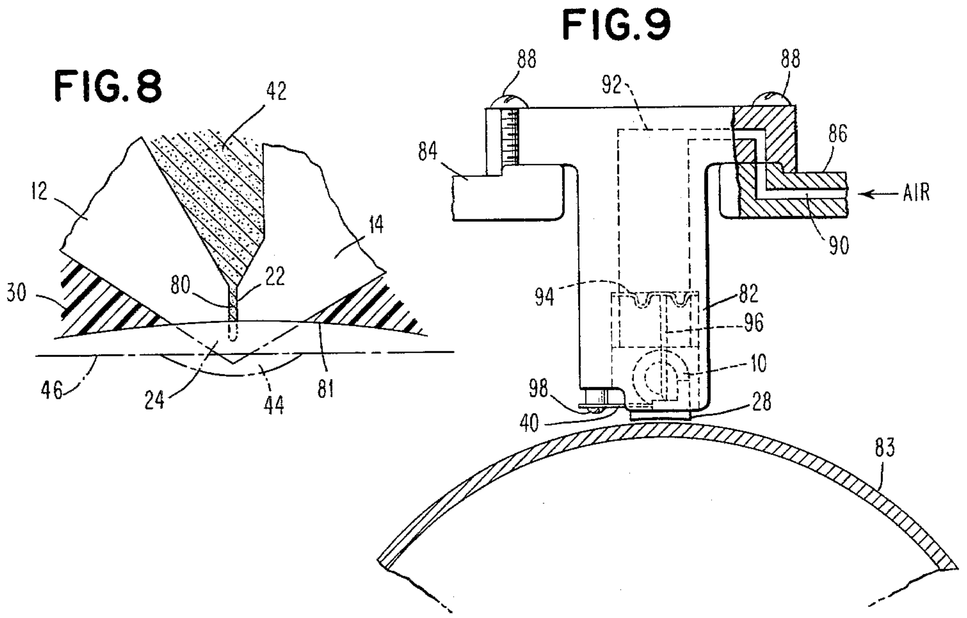
FIG. 8 is an enlarged fragmentary cross-sectional view showing the modification to the shoe and core workpieces effected by the material removal process step of FIG. 7.
FIG. 9 shows schematically the operative position of the finished magnetic transducer shoe in a typical magnetic head, mounted for operation in conjunction with a magnetic drum.

The results of the grinding and polishing operation of FIG. 7 are shown in FIG. 8. In this enlarged fragmentary sectional view it is shown that the original bottom surface 46 of the shoe body 30 has been ground away to a cylindrical surface 81. In the process, the excess cement or potting material 44 and the bridge portion 24 of the core workpiece have been removed so that the slot 22 now extends entirely through the core to form a closely dimensioned and aligned gap therein.

To complete the transducer shoe structure, suitable read and/or write coils are wound on or otherwise applied to the core 10. This may be done at any convenient time; such windings are shown already in place on the core 10 in FIG. 7.

One example of a transducer including a shoe of the type which may be manufactured in accordance with the foregoing method is shown, in use, in FIG. 9. In that figure a transducer head body 82 mounts the transducer shoe so that the shoe body 28 of the latter extends into operating juxtaposition with the surface of a magnetic drum 83. The transducer head may be of a type which is mounted on a stationary supporting frame 84, 86 by screws 88, with the supporting frame having an air supply channel 90 communicating with the chamber 92 within the head. The air pressure is active against a bellows or diaphragm 94 in the chamber 92 to operate a push rod 96 which is received in the socket 36 of the shoe body. Thus the air pressure is operative to urge the shoe body toward the drum, into a very close proximity therewith maintained only by the film of air between the shoe 48 and the surface of the drum 83, which film is induced by motion of the drum. For locating the shoe 28 in the transducer head 82, the flexure plates or anchorages 38, 40 of the shoe are attached as shown at 98 to the head 82.

In some cases it is desired to carry out the final polishing operation with 3000 grit in an arrangement similar to the operative arrangement of FIG. 9, instead of in the jig of FIG. 7. In this event, a polishing wheel of a suitable dimension and axis location, carrying 3000 grit on its cylindrical surface, is substituted for the drum and operated at a lower speed which enables air pressure applied to the head 82 to force the shoe body 28 against the polishing wheel.

It will be understood that the manufacturing method of the invention may be employed in the making of devices which vary, in configuration and structure, from the magnetic head shoes described hereinabove. For example, while its role in the method and product is a matter of preference as well as convenience, the shoe body 30 is not a necessary element in every embodiment of the invention. Other means could be employed for aiding in the placement and retention of the filler or casting compound 42 in the slot 22. Similarly, the final shape of the bottom of the shoe body 30 could be convex or planar or any shape desired in the product and could, in some instances, remain untouched during removal of the bridge portion 24.

Similarly, the potting step could be carried out in such a way as to avoid entry of the casting material 42 into the slot and still operate to fix and maintain the core gap after removal of the bridge portion 24. However, the illustrated method, wherein the slot 22 is filled with casting or potting material is preferred since the filler material excludes foreign material from the slot and from the gap which it becomes, and rigidizes the structure.

Accordingly, while the invention has been particularly shown and described with reference to a preferred embodiment thereof, it will be understood by those skilled in the art that the foregoing and other changes in form and details may be made therein without departing from the spirit and scope of the invention.

What is claimed is:

The method of making a magnetic transducer head comprising a shoe having a magnetic core with a gap therein, which comprises providing a laminated magnetic core workpiece, wire saw cutting a uniform width slot in but not completely through the workpiece transverse to the laminae therein, whereby said core workpiece comprises an integral bridge portion across a blind end of said slot and pole workpiece portions embracing said slot, providing a shoe body workpiece having a cavity therein configured to receive said pole workpiece portions of said core workpiece but to have a substantial clearance therefrom in the region of said slot, said cavity extending into intersection with a bottom surface of said shoe workpiece so as to provide an aperture in said bottom surface, inserting said pole workpiece portions into position in said cavity with said bridge portion protruding through said aperture, potting said pole workpiece portions in said position with a non-magnetic casting material which fills said slot and at least the portions of said cavity surrounding said pole workpiece portions, and then grinding away said bridge portion to a line which intersects said slot, first said bridge portion and then said casting material being operative at the successive cutting and grinding steps of the process to maintain said laminae in alignment and to prevent bending and resultant cold working of the core.

References Cited by the Examiner

UNITED STATES PATENTS

| | | | |
|---|---|---|---|
| 1,254,664 | 1/1918 | Downes et al. | 29—155.56 |
| 2,734,941 | 2/1956 | Zenel | 179—100.2 X |
| 2,883,818 | 4/1959 | Gieskieng | 29—155.59 |
| 2,999,906 | 9/1961 | Metz | 179—100.2 |
| 3,086,087 | 4/1963 | Johnson | 340—174.1 |

FOREIGN PATENTS

| | | |
|---|---|---|
| 924,059 | 2/1955 | Germany. |
| 827,335 | 2/1960 | Great Britain. |
| 870,107 | 6/1961 | Great Britain. |
| 874,338 | 8/1961 | Great Britain. |

WHITMORE A. WILTZ, *Primary Examiner.*

JOHN F. CAMPBELL, *Examiner.*